(12) United States Patent
Palm

(10) Patent No.: US 6,708,709 B1
(45) Date of Patent: Mar. 23, 2004

(54) METHOD OF REGULATING A STEAM INJECTOR

(75) Inventor: Bengt Palm, Genarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/889,428
(22) PCT Filed: Jan. 25, 2000
(86) PCT No.: PCT/SE00/00151
§ 371 (c)(1),
(2), (4) Date: Sep. 4, 2001
(87) PCT Pub. No.: WO00/45100
PCT Pub. Date: Aug. 3, 2000

(30) Foreign Application Priority Data

Jan. 26, 1999 (SE) .............................................. 9900218

(51) Int. Cl.⁷ .............................. F28C 3/02; A23L 3/22
(52) U.S. Cl. ........................... 137/13; 137/14; 137/111; 137/340; 99/452; 422/26; 426/522
(58) Field of Search ............................ 137/13, 14, 114, 137/340; 99/452; 422/26; 426/471, 476, 511, 521, 522

(56) References Cited

U.S. PATENT DOCUMENTS

| | | | |
|---|---|---|---|
| 3,724,093 A | | 4/1973 | Olila |
| 3,927,974 A | * | 12/1975 | Johansson et al. ............. 422/26 |
| 4,023,537 A | | 5/1977 | Carter, Sr. et al. |
| 4,648,421 A | | 3/1987 | Chant et al. |
| 4,689,237 A | * | 8/1987 | Fabre .......................... 426/521 |
| 4,715,791 A | | 12/1987 | Berlin et al. |
| 4,759,695 A | | 7/1988 | Bordini |
| 4,776,367 A | | 10/1988 | Hilmersson et al. |
| 4,784,697 A | | 11/1988 | Bordini |
| 4,851,250 A | * | 7/1989 | Bronnert ...................... 426/511 |
| 4,874,021 A | | 10/1989 | Ringdahl et al. |
| 5,024,584 A | | 6/1991 | Bordini et al. |
| 5,395,569 A | * | 3/1995 | Badertscher et al. .......... 261/62 |
| 5,824,266 A | | 10/1998 | Badertscher et al. |

FOREIGN PATENT DOCUMENTS

| | | |
|---|---|---|
| EP | 0724079 A1 | 7/1996 |
| SE | 367121 | 8/1974 |
| WO | 84/02062 A1 | 6/1984 |

* cited by examiner

Primary Examiner—David A. Scherbel
Assistant Examiner—Ramesh Krishnamurithy
(74) Attorney, Agent, or Firm—Burns, Doane, Swecker & Mathis, L.L.P.

(57) ABSTRACT

The disclosure relates to a method of regulating a steam injector. The injector is of the type which has an inlet for steam and an inlet for the product which is to be heat-treated, as well as an outlet for the ready-treated product. The injector further has a centrally placed regulator spindle around which are disposed concentric gaps for product and steam, respectively. The aperture in the gaps may be regulated in that the regulator spindle is protracted or retracted reciprocally. The regulator spindle is regulated by means of a switching device which is controlled via a regulator. The regulator registers the values from a pressure indicator in the product inlet and a pressure indicator in the product outlet.

Figure 1:
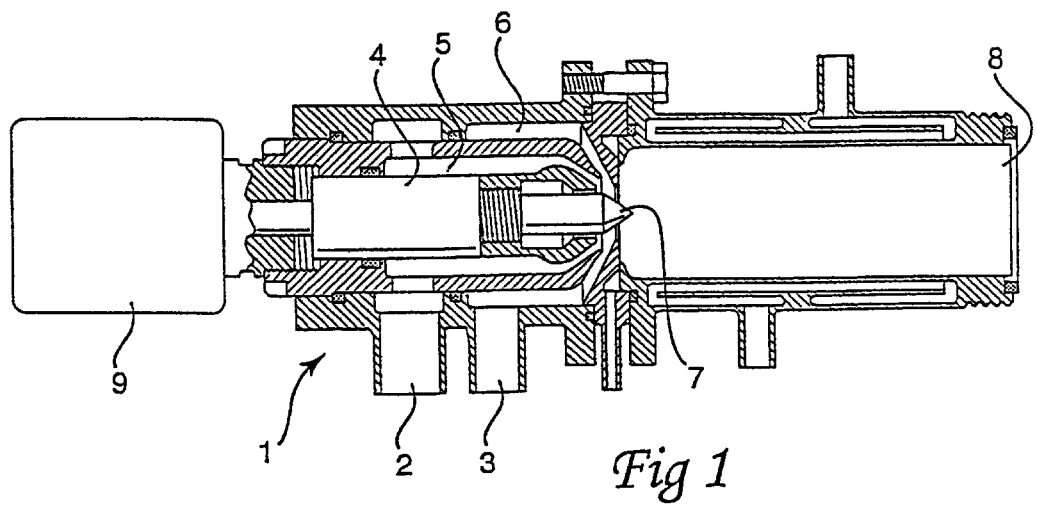

8 Claims, 1 Drawing Sheet

METHOD OF REGULATING A STEAM INJECTOR

TECHNICAL FIELD

The present invention relates to a method of regulating a steam injector of the type which has an inlet for steam and an inlet for the product which is to be heat-treated, as well as an outlet for the ready-treated product, the steam injector further having concentrically disposed gaps for steam and product, the gaps being capable of being regulated in that a centrally disposed regulator spindle is protracted or retracted reciprocally.

BACKGROUND ART

Heat-treating liquid foods such as milk or juice in order to render them aseptic results in a product which remains stable on storage at room temperature. The aseptic product contains no harmful micro-organisms which can grow during storage, and no unbroken refrigeration chain is needed for distributing the product, which may be an advantage above all in the developing countries.

There are different methods of heat-treating foods, of which two main groups may be distinguished—indirect and direct heating. The indirect methods consist of treatment in various types of heat exchangers. Of the direct methods, mention might be made of treatment using steam in an injector and heating by means of infusion.

All methods of heat-treating today strive for as gentle a heating as possible in order to avoid deterioration in the flavour of the product, at the same time as the method must be both effective and reliable. The direct methods thereby offer a more rapid heating of the product, with the result that it is possible to reduce the treatment time. By such means, an overall reduced thermal effect on the product is achieved, which entails that the product receives a gentler treatment as far as the flavour is concerned.

The present invention relates to a method which is applicable to an injector, which entails that a reliable and effective treatment of the product is obtained. An injector of the type which is contemplated here is described in Swedish Patent Specification SE 367 121. The injector, which is of the so-called annular gap type, has an inlet for steam and an inlet for product. Product and steam are distributed in different concentric gaps around a regulator spindle and converge together, a condensation of the steam in the product being obtained.

In order to obtain an effective condensation of the steam in the product, a constant pressure difference must be maintained over the injector. The prior art injectors had a key grip in order to make for regulation of the position of the regulator spindle in the injector, which, however, entailed that careless or unskilled regulation would result in incomplete condensation. A certain minimum pressure drop must exist, since otherwise rapid and exaggerated pressure and temperature oscillations would occur, with the result that no reliable heat-treatment is achieved. Moreover, a certain minimum pressure drop is a mandatory requirement placed by the authorities in certain countries.

The injectors available on the market today are most generally set at fixed capacities by means of replaceable spacer washers. However, this is a disadvantage since it is not possible rapidly and simply to regulate the capacity of the injector. The need to be able to regulate the capacity of the injector exists, for example, in the event of loss of a filling machine during production or in the event of product change if there is no sterile tank acting as a buffer in the plant. In, for example, the loss of a filling machine in the plant, it is at present necessary to recirculate the excess product over the plant, with a deterioration in the product quality as a result.

OBJECT OF THE INVENTION

One object of the present invention is therefore to realise a method of simply and reliably regulating the gaps in a steam injector, while maintaining a constant pressure difference over the injector.

SOLUTION

This and other objects have been attained according to the present invention in that the method of the type described by way of introduction has been given the characterizing feature that the regulator spindle is regulated by means of switching device, the switching device being controlled by the pressure difference between a pressure measured in the product inlet and a pressure measured in the product outlet.

One preferred embodiment of the method according to the present invention has further been given the characterizing features as set forth in the appended subclaims.

BRIEF DESCRIPTION OF THE ACCOMPANYING DRAWINGS

Figure 2:
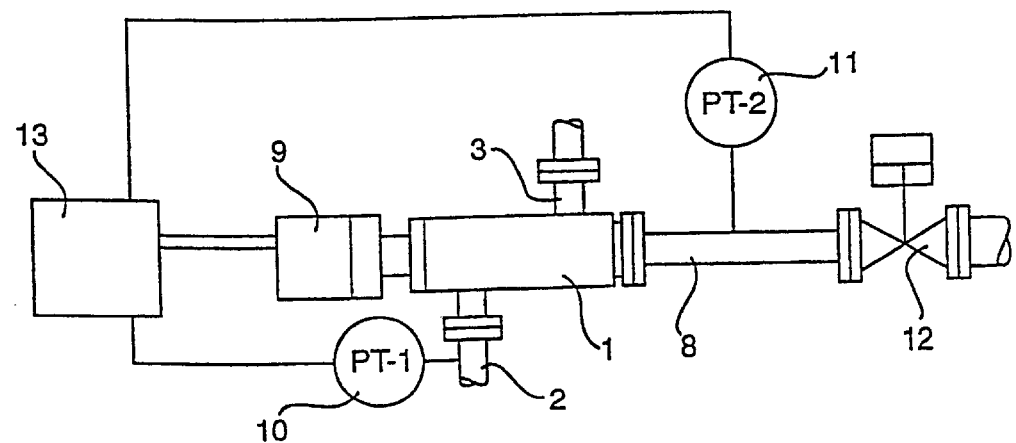

One preferred embodiment of the present invention will now be described in greater detail hereinbelow, with particular reference to the accompanying Drawings, in which:

FIG. 1 shows, partly in section, a side elevation of an injector for which the method according to the present invention may be employed; and FIG. 2 is a flow diagram for carrying the method according to the present invention into effect.

The Drawings show only those parts and details essential to an understanding of the present invention, and the location of the injector in a heat-treatment plant—which is well-known to a person skilled in the art—has been omitted.

DESCRIPTION OF PREFERRED EMBODIMENT

FIG. 1 shows an injector 1 of the type which is entitled an annular gap injector and which is described in greater detail in Swedish Patent Specification SE 367 121. The injector 1 has an inlet 2 for the product which is to be heat-treated and in inlet 3 for steam. The injector 1 further has a centrally placed regulator spindle 4 which may be protracted and retracted reciprocally in the injector 1.

Around the regulator spindle 4, there are gaps 5 and 6 for product and steam, respectively, which discharge concentrically around the front section 7 of the central regulator spindle 4. The injector 1 also possesses an outlet 8 for the ready-treated product. The injector 1 according to the present invention is further provided with a switching device 9 for displacing the regulator spindle 4. The switching device 9 may displace the regulator spindle 4 stepwise or alternatively steplessly.

The function of the injector 1 is as follows: Product such as milk or juice is led under pressure into the injector 1 through the inlet 2. Pressurized steam is similarly fed through the inlet 3. The product and the steam distribute in each respective gap 5 and 6, and where the gaps 5 and 6 converge at the front section 7 of the regulator spindle 4, product and steam meet and a condensation takes place almost instantaneously. In the outlet 8, there will be a reduction in speed, and thereby an increase in pressure which completes the condensation of the steam.

In order to be able to regulate the pressure drop over the injector's 1 capacity, the regulator spindle 4 may be protracted or retracted reciprocally, and in such a manner the aperture for the product gap 5 and the steam gap 6 is regulated. For example, regulation of the injector 1 may be necessary when a filling machine is lost in a plant which has no buffer in the form of a sterile tank, in which event the capacity of the plant must be altered. By being able to regulate the injector 1, a minimum constant pressure drop will be ensured over the injector 1 and there will thereby be obtained a reliable and effective heat-treatment of the product.

The method according to the present invention of regulating the injector 1 is apparent from the flow diagram in FIG. 2. The injector 1 has a pressure indicator 10 placed in the product inlet 2 and a pressure indicator 11 placed in the product outlet 8. After the outlet 8, there is moreover provided a constant pressure regulating valve 12 in order that the pressure in the product outlet 8 can be kept at a determined level in order to prevent boiling and frothing in the product outlet 8.

The values measured in the pressure indicators 10 and 11 are registered in a regulator 13. The regulator 13 is a constant pressure difference regulator which compares the pressure difference between the measured values from the pressure indicator 11 in the product outlet 8 and the pressure indicator 10 in the product inlet 2. The regulator 13 controls the switching device 9 which in turn displaces the regulator spindle 4 back or forth in the injector 1 so that the pressure difference is kept at a constant level. Given that the pressure difference over the injector 1 is kept constant regardless of variations in the product flow, a stable function in the injector 1 will be obtained. At the same time, it is ensured that a minimum permitted pressure difference exists, for those countries where such demands are mandatory.

As a result of the possibility of regulating the capacity of a steam injector according to the method of the present invention, a stable function for the injector will be attained. The method makes for a simple and reliable regulation, for example in the event of the loss of a filling machine in the plant where the injector is included.

What is claimed is:

1. A method of regulating a steam injector having an inlet for steam and an inlet for a product which is to be heat-treated, as well as an outlet for a ready-treated product, the steam injector further having concentrically disposed gaps for steam and product, the gaps being capable of being regulated in that a centrally disposed regulator spindle is protracted or retracted reciprocally, the method step including:

regulating the regulator spindle wherein the regulator spindle is regulated by means of a switching device, the switching device and controlling the switching device, wherein being controlled by the pressure difference between a pressure measured in the product inlet and a pressure measured in the product outlet.

2. The method as claimed in claim 1, wherein the switching device is controlled via a regulator which registers the values from a pressure indicator in the product inlet and a pressure indicator in the product outlet.

3. The method as claimed in claim 1, wherein the displacement of the regulator spindle takes place stepwise.

4. The method as claimed in claim 1, wherein the displacement of the regulator spindle is stepless.

5. A method for regulating a steam injector, the steam injector having an inlet for steam, an inlet for product to be heat treated and an outlet for ready-treated product, the steam injector also having concentrically disposed gaps for the steam and the product, the method comprising:

controlling a switching device, the switching device being controlled by a pressure difference between a pressure measured in the product inlet and a pressure measured in the product outlet; and regulating the concentrically disposed gaps, the concentrically disposed gaps being regulated with a centrally disposed regulator spindle which is protracted or retracted reciprocally wherein the centrally disposed regulator spindle is regulated by the switching device.

6. The method as claimed in claim 5, wherein the switching device is controlled via a regulator which registers the values from a pressure indicator in the product inlet and a pressure indicator in the product outlet.

7. The method as claimed in claim 5, wherein the displacement of the regulator spindle takes place stepwise.

8. The method as claimed in claim 5, wherein the displacement of the regulator spindle is stepless.

\* \* \* \* \*